US010282456B2

(12) United States Patent
Brown et al.

(10) Patent No.: US 10,282,456 B2
(45) Date of Patent: May 7, 2019

(54) MANAGING CONTACT CENTER METRICS

(71) Applicant: Avaya Inc., Santa Clara, CA (US)

(72) Inventors: Douglas S. Brown, Boulder, CO (US); Marc A. Geist, Broomfield, CO (US); Sheila Higgins, Broomfield, CO (US); Michael R. Levacic, Kitchener (CA); Hongguang Li, Broomfield, CO (US); Dwayne W. Ockel, Northglenn, CO (US); Gregory P. Schin, Highlands Ranch, CO (US); Stuart M. Shepherd, Thornton, CO (US); Lynn R. Smith, Westminster, CO (US); Stan W. Wilkison, Arvada, CO (US)

(73) Assignee: Avaya Inc., Santa Clara, CA (US)

( * ) Notice: Subject to any disclaimer, the term of this patent is extended or adjusted under 35 U.S.C. 154(b) by 824 days.

(21) Appl. No.: 14/872,998

(22) Filed: Oct. 1, 2015

(65) Prior Publication Data

US 2017/0097971 A1    Apr. 6, 2017

(51) Int. Cl.
  *G06F 17/30* (2006.01)
  *G06F 3/0484* (2013.01)
  *G06F 3/0482* (2013.01)

(52) U.S. Cl.
  CPC ...... *G06F 17/30572* (2013.01); *G06F 3/0482* (2013.01); *G06F 3/04842* (2013.01); *G06F 17/30569* (2013.01)

(58) Field of Classification Search
  None
  See application file for complete search history.

(56) References Cited

U.S. PATENT DOCUMENTS

| 8,175,254 B2 | 5/2012 | Li et al. |
| 8,385,532 B1 | 2/2013 | Geist et al. |
| 8,781,880 B2 | 7/2014 | Kocsor et al. |
| 2003/0023570 A1* | 1/2003 | Kobayashi ........ G06F 17/30675 706/15 |
| 2007/0094384 A1* | 4/2007 | Matsumura ............ G06Q 10/10 709/224 |
| 2009/0172194 A1* | 7/2009 | Ristock ............... H04L 41/5064 709/244 |
| 2014/0233720 A1 | 8/2014 | Ye et al. |

OTHER PUBLICATIONS

U.S. Appl. No. 14/562,456, filed Dec. 5, 2014, Reilly et al.
Raschka, "Implementing a Principal Component Analysis (PCA)," Sebastian Raschka, 2014, retrieved from http://sebastianraschka.com/Articles/2014_pca_step_by_step.html, retrieved on Apr. 13, 2016, 20 pages.

* cited by examiner

*Primary Examiner* — Anhtai V Tran
(74) *Attorney, Agent, or Firm* — Sheridan Ross P.C.

(57) ABSTRACT

A contact center includes: a microprocessor; a computer readable medium, coupled to the microprocessor, to store, for one or more contact center objects, contact center information; and a microprocessor executable report generator, The report generator, when executed, receives, from a user, a selected contact center object, retrieves, from the computer readable medium, a set of data elements associated with the selected contact center object, the set of data elements defining a first space having a first dimension, projects the set of data elements onto a subspace of the first space to form a transformed set of data elements, the subspace having a second dimension less than the first dimension, and provides, for display to a user, the transformed set of data elements.

20 Claims, 8 Drawing Sheets

MANAGING CONTACT CENTER METRICS

BACKGROUND

The systems and methods disclosed herein relate to contact centers and in particular to managing metrics in contact centers.

Today, a large number of contact centers maintain a contact center control room where there are multiple people responsible for monitoring the overall health and activity of one or more contact centers. The contact center control room normally has responsibility to route calls from one contact center to another, contact agents or their managers to find out why certain agents are not available for calls, respond to critical events and outages, etc. The responsibility of the control room is to ensure that the contact centers are operating smoothly.

Often, the contact centers control room focuses on monitoring at agent skill level and/or a Vector Directory Number (VDN) level. These types of metrics are typically referred to as contact center metrics. For example, a contact center may have 1437 agent skills and 2058 VDNs on one automatic call distributor (ACD). These call center metrics are typical and well within the limitations of current call management systems (CMS), which may be able to handle 8,000 skills per ACD and 30,000 VDNs per ACD. It is not humanly possible for a small set of people to actively watch and monitor that many skills and VDNs at the same time. Color-coding anomalies captured by configured thresholds are one way this has been addressed. Color-coding anomalies is done to highlight specific configured thresholds. The severity of the anomalies can be color coded to identify a specific severity.

Call Management Systems (CMS) are used to view the reports within a contact center. This is typically done in a control room. However, a control room user is still limited to the number of report screens/displays that he or she can simultaneously run. The control room users have learned that multiple Call Management System (CMS) supervisor instances can be started and one CMS can support multiple logins. For example, two Supervisor instances may be logged into the same CMS server. Each skill may have approximately 1000 active agents. Each Supervisor instance can run approximately 10 reports at the same time. Each report may refresh every 3 seconds with new data to consider. Even with this limited picture of the contact center that includes thresholds and exceptions in each report, the displays provide a tremendous amount of data to take in and comprehend.

BRIEF SUMMARY

The proposed disclosure provides statistical data collection and adaptive analytical reporting that is fully user configurable. A plurality of separate reports are received. The plurality of separate reports each comprise different contact center metrics. For example, the plurality of reports may be based on metrics, such as, agent skill sets, contact center queues, etc. A first determination is made that a first contact center metric in a first report exceeds a first historical level, e.g., if a number of incoming calls have exceeded a threshold. A second determination is made that a second contact center metric in a second report exceeds a second historical level, e.g., if a contact center queue is 20% above historical averages. The first and second contact center metrics are rendered for display to a user in a common report window.

The terms "determine", "calculate" and "compute," and variations thereof, as used herein, are used interchangeably and include any type of methodology, process, mathematical operation or technique.

DETAILED DESCRIPTION

Figure 1:
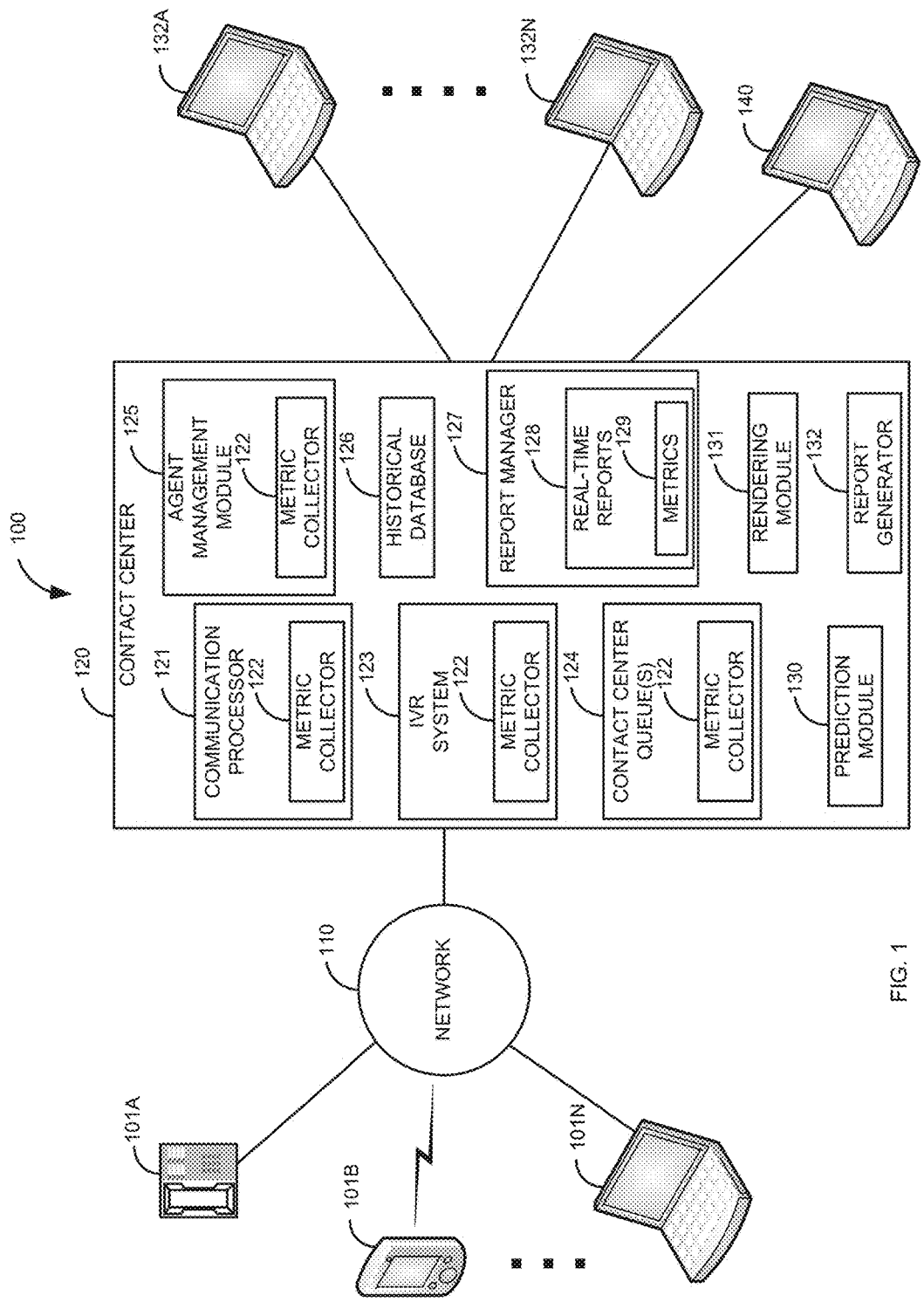
FIG. 1 is a block diagram of a first illustrative system for managing contact center metrics.

FIG. 1 is a block diagram of a first illustrative system 100 for managing contact center metrics 129. The first illustrative system 100 comprises communication endpoints 101A-101N, a network 110, a contact center 120, agent terminals 132A-132N, and an administrative terminal 140.

The communication endpoint 101 can be or may include any device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication endpoints 101A-101N may be connected to the network 110, including only a single communication endpoint 101. The communication endpoints 101A-101N are used by customers to initiate/receive communications to and from the contact center 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, email protocols, Instant Messaging (IM) protocols, and the like. Thus, the network 110 is an electronic communication network or computer network configured to carry messages via packets and/or circuit switched communications.

The contact center 120 can be or may include any hardware, which when coupled with software/firmware that can be used for routing and management of electronic communications to contact center agents, such as an ACD system, a call router, a communication manager, and/or the like. The contact center 120 can handle various types of communication, such as voice communications, video communications, email communications, text communications, IM communications, and/or the like.

The contact center 120 further comprises a communication processor 121, an Interactive Voice Response (IVR) system 123, contact center queue(s) 124, an agent management module 125, an historical database 126, a report manager 127, a prediction module 130, a rendering module 131, and a report generator 132. The contact center 120 is shown as a single element. However, is some embodiments, the contact center 120 may have various elements (elements 121-132) distributed within the network 110.

The communication processor 121 can be any hardware coupled with software/firmware that can route communications, such as an ACD system, a router, a Private Branch Exchange (PBX), a switch, a communication manager, a session manager, an email system, an IM system, and/or the like. The communication processor 121 is used in managing/routing communications, such as voice communications, video communications, email communications, text communications, IM communications, and/or the like.

The communication processor 121 also includes a metric collector 122. The metric collector 122 is used for collecting real-time contact center metrics 129 for the contact center 120. The metric collector 122, in the communication processor 121, collects contact center metrics 129 associated with the communication processor 121.

A contact center metric 129 can be or may include any information tracked by the contact center 120, such as, vector directory numbers (VDNs), an agent skill(s) (e.g., a specific type product a contact center agent can support), a skill group (e.g., a number of contact center agents assigned to support a specific product or service), a total number of available trunks, a total number of call work codes, a total number of vectors, a number of incoming calls, a number of call drops, a number of call hang-ups, a number of call routes, a number of out-going calls, a number of incoming or outgoing emails, a number of current, incoming, or outgoing Instant Messaging sessions, a number of outgoing calls, a number of received text messages, a number of sent text messages, a number of received video calls, a contact center queue level, a number of work items, a number of IVR responses, and/or the like.

The contact center metrics 129 can form multiple data element sets. Each data element set typically includes activities of different contact center objects that can be monitored, either historically or substantially in real-time, to produce corresponding contact center metrics 129. Exemplary contact center objects include, without limitation, contact center agents, splits, Vector Directory Numbers ("VDNs"), work items (e.g., inbound or outbound communications with third party customers), and vectors. The data element sets typically have the same types of data elements (e.g., data elements having a common class label) and are comparable or have matching, or identical, numbers and types of data elements.

For example, a first data element set comprises multiple data elements in the form of a first type of contact center metric corresponding to a first contact center object and a second data element set comprises multiple data elements in the form of a second type of contact center metric corresponding to a different second contact center object. The first and second data element sets have the same number and the first and second contact center objects are the same types of contact center objects, e.g., the first and second contact center objects are different contact center agents, splits, VDNs, vectors, and the like.

The Interactive Voice Response (IVR) system 123 is an interactive voice/video response system that allows interaction with a caller. For example, the IVR 123 may provide a menu to an incoming caller where the caller can select a product or service to discuss with a contact center agent. The IVR system 123 also includes the metric collector 122. The metric collector 122 in the IVR system 123 collects contact center metrics 129 for the IVR system 123, such as, customer selections, call routing information, customer feedback information (e.g., survey information), and/or the like.

The contact center queue(s) 124 can be, or may include any hardware/software that can hold one or more communications for servicing by a contact center resource, such as a contact center agent, a supervisor, the IVR system 123, and/or the like. The held communications can be voice communications, video communication, email communications, text communications, IM communications, and/or the like. The communication may be incoming, current, or outgoing communications. The contact center queue(s) 124 can hold communications based on various criteria, such as a type of product, a type of service, a service level agreement, and/or the like. The contact center queue(s) 124 further comprise the metric collector 122. The metric collector 122 in the contact center queue(s) 124 collects contact center metrics 129 associated with the contact center queue(s) 124, such as call wait times, email service times, IM wait times, current communications being held in the contact center queue(s) 124, the number of contact center queues 124, call drops while being queued, and/or the like.

The agent management module 125 can be or may include any hardware/software that is used for managing contact center agents. The agent management module 125 is used by an administrator to define agent skills, agent skill groups, agent schedules, agent break times, agent vacation times, agent assignments, agent contact center queue 124 assignments, agent skills, and/or the like. The agent management module 125 also includes the metric collector 122. The metric collector 122 in the agent management module 125 collects contact center metrics 129, such as those described above.

The historical database 126 can be or may include any kind of database for storing historical information/contact center metrics 129. The historical database 126 can be any type of database, such as a relational database, a hierarchical database, a directory service, a file system, and/or the like. The historical database 126 is used to store historical information, such as contact center metrics 129 that are collected from the various metric collectors 122. The historical database 126 includes historical information of various real-time reports 128.

The report manager 127 can be or may include any hardware/software that can manage real-time reports 128. A real-time report is a report that is automatically generated based on the gathering of the real-time metrics. For example, a real-time report may be generated every 2 seconds or generated based on any change of a metric. Thus, a real-time report may be generated in real-time or in near real-time based on the process used. As discussed herein, a real-time report would cover a report generated in real-time or near-real time.

In one embodiment, the specific metrics for a real-time report may be automatically changed (e.g., added or removed) based on different criteria, such as, based on a call volume, based on a time of day, based on a lack of volume, and/or the like. For example, if a call volume reaches a threshold, the number of metrics that are in a report may go from all 10,000 active calls (VDNs) down to 20 calls that have the longest hold time or to 20 calls that are currently on call with an agent for the longest period of time.

A cost function can be defined for the sets of data elements. A cost function is a mathematical formula used to predict a cost associated with a certain action or a certain level of output. The user defines the cost function by setting thresholds defining what is acceptable and unacceptable data element values. A cost function corresponds to data element sets corresponding to a common type of contact center object and/or contact center metric.

The report manager 127 gets the real-time reports 128 from the report generator 132. A real-time report 128 is a grouping of contact center metrics 129 based on various criteria, such as a group of contact center agents, a group of VDNs, a group of agent skills, contact center queue(s) 124 level, a marketing projection, a manufacturing level, a shipping level, an inventory level, IVR responses times, IVR responses, call routing, email levels, text messaging levels, call waiting times, IM waiting time, contact center queue 124 levels, contact center agent input, communications handled per agent, communications handled per contact center agent group, and/or the like. A real-time report 128 can be defined based on input from an administrator. For example, a real-time report 128 may be created by an administrator based different agent skills for a specific product. The real-time reports 128 are separately defined real-time reports 128.

The prediction module 130 can be or may include any hardware/software that can be used to predict how changes to the contact center 120 will affect different real-time reports 128/contact center metrics 129. The prediction module 130 can be used by an administrator to predict and make changes to the contact center groups.

The rendering module 131 can be or may include any hardware/software that can render information for display to a contact center agent/administrator. For example, the rendering module 131 can be a web server that is used by the agent terminals 132/administrative terminal 140. The rendering module 131 can include other elements, such as a video processor, a video card, and/or the like. The rendering module 131 may be distributed between the contact center 120 and the agent terminals 132A-132N/administrative terminal 140. The rendering module 131 can send information that is then displayed at the agent terminals 132A-132N and/or the administrative terminal 140.

The report generator 132 can be or may include any hardware/software that can collect the contact center metrics 129 from the various metric collectors 122. The report generator 132 generates the real-time reports 128 based on the defined groupings or data sets of contact center metrics 129. The real-time reports 128 are then sent to the report manager 127.

The agent terminals 132A-132N can be any communication device that is used by a contact center agent, such as the communication endpoint 101. The agent terminals 132A-132N may comprise multiple devices, such as a telephone and a personal computer. The agent terminals 132A-132N can include any number of agent terminals 132. For example, a large contact center 120 may comprise 10,000 agent terminals 132. The agent terminals 132A-132N are shown directly connected to the contact center 120. However, in some embodiments, the agent terminals 132A-132N are connected to the contact center 120 via a separate network 110, such as a private or corporate network. In some embodiments, some or all of the agent terminals 132A-132N may be connected to the network 110.

The administrative terminal 140 can be any communication device used by an administrator to manage the contact center 120, such as the communication endpoint 101. The administrative terminal 140 can comprise a plurality of administrative terminals 140. The administrative terminal 140 is shown as being directly connected to the contact center 120. However, in other embodiments, the administrative terminal 140 may be connected via the network 110 or via a separate network 110.

Figure 2:
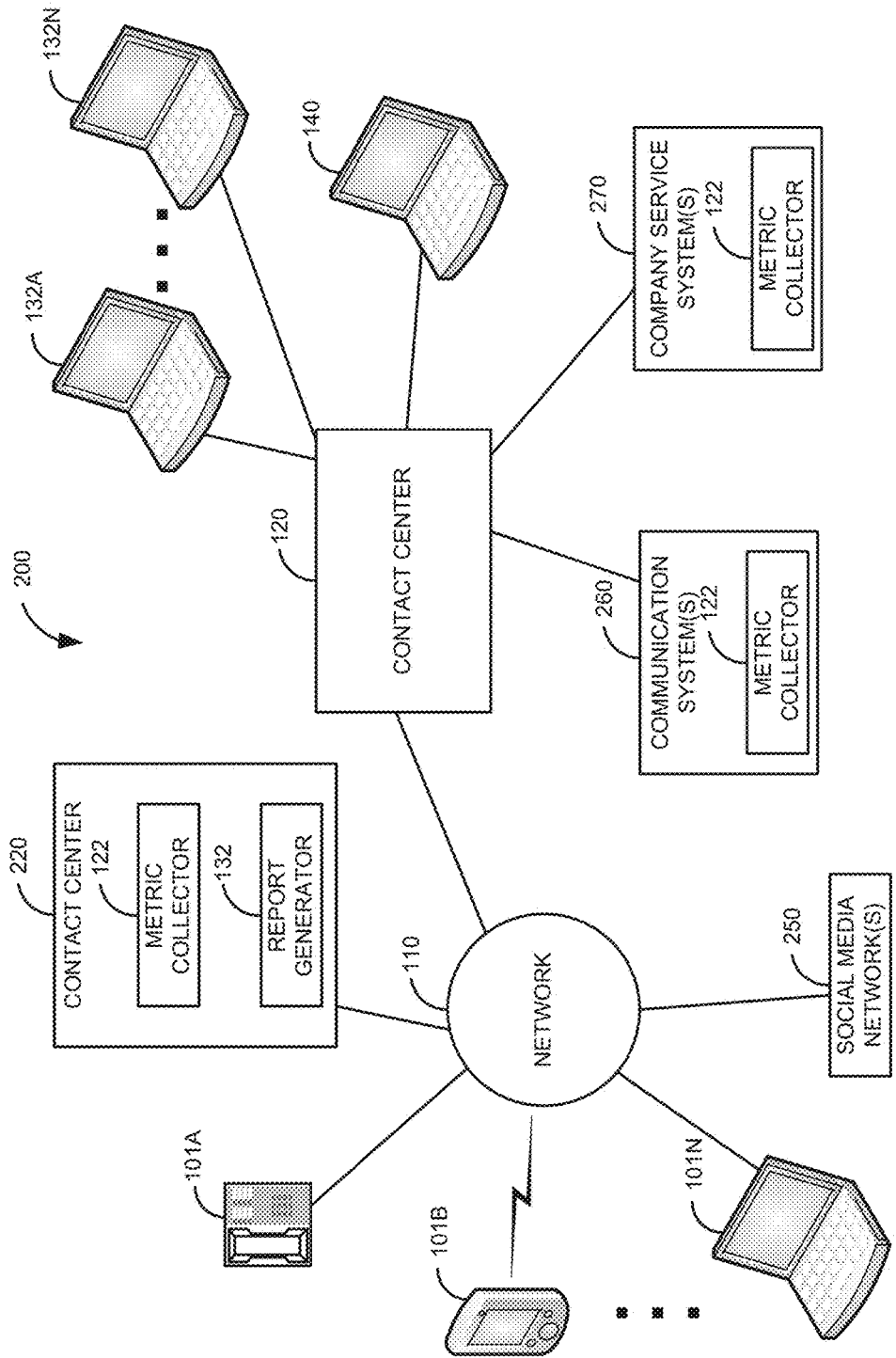
FIG. 2 is a block diagram of a second illustrative system for managing contact center metrics from multiple contact centers.

FIG. 2 is a block diagram of a second illustrative system 200 for managing contact center metrics 129 from multiple contact centers 120/220. The second illustrative system 200 comprises the communication endpoints 101A-101N, the network 110, the contact center 120, the agent terminals 132A-132N, the administrative terminal 140, a contact center 220, social media network(s) 250, communication system(s) 260, and company service system(s) 270.

The contact center 220 is contact center 220 that is remote to the contact center 120. For example, the contact center 120 may be in the United States and the contact center 220 may be located in India. Although not shown, the contact center 220 may include all or some of some of the elements 121-131 of the contact center 120. The contact center 220 may comprise a plurality of different remote contact centers 220.

The contact center 220 further comprises the metric collector 122 and the report generator 132. The report generator for the contact center 220 collects contact center metrics 129 in a similar manner as the report generator 132 described in FIG. 1. For example, the report generator in the contact center 220 may collect contact center metrics 129, via the metric collector 122, from a communication processor 121, an IVR system 123, contact center queue(s) 124, and/or an agent management module 125 that are in the contact center 220.

Each of the metric collectors 122 may run as separate computer processes, such as separate threads, daemons, or virtual machines. In a multi-tasking system, an individual processor may handle multiple processes, sometimes called a thread or daemon. The multiple threads may be for different applications or for a separate process that provide background processing at specific time intervals. For example, there may be separate threads for each of the metric collectors 122. The threads may be started at periodic time intervals or run continuously. The threads may start asynchronously or synchronously. When started, an individual thread for one or more of the metric collectors 122 may gather metrics 129 to send to the report manager 127. Once the metrics 129 are gathered and sent, the thread may end. This process can then be repeated to gather more metrics 129 based on the time interval.

Alternatively, a thread may be started based on a hardware timer that triggers a hardware interrupt on a microprocessor. In response to receiving the hardware interrupt based on the timer, the processor calls an interrupt service routine that can collect metrics 129 for sending to the report manager 127.

Threads may start based on an event. For example, the metric collector 127 may have a thread that starts upon receipt of a message or packet (e.g., based on a hardware interrupt from a network interface computer chip that triggers a hardware interrupt service routine). When a message is received that indicates to gather metrics 129, the interrupt service routine can gather the metrics 129 and send the metrics to the report manager 127.

In a system that uses multiple processors, or a multi-core processor, one or more of the metric collectors 122 may run on separate processors and/or virtual machines. In this case, messages can be sent between the separate virtual machines to gather the metrics 129 from the metric collectors 129.

The contact center 120 may receive real-time reports 128 from the report generator 132 in the contact center 220. The real-time reports 128 may be all or a subset of the real-time reports 128 that can be defined in the contact center 220. For example, an administrator of the contact center 120/220 may define specific real-time reports 128 that are sent by the report generator 132 in the contact center 220 to the report manager 127 in the contact center 120.

Alternatively, the report generator 132 in the contact center 120 may receive the contact center metrics 129 directly from the metric collector 122 in the contact center 220. The report manager 127 in the contact center 120 may use the contact center metrics 129 collected from the contact center 220 to create one or more real-time reports 128. An individual report may include contact center metrics 129 from the contact center 220 and the contact center 120. For example, a real-time report 128 may include agent skills from the contact center 220 and the same agent skills from the contact center 120.

In one embodiment, the contact center 120 is disparate from the contact center 220. For example, the contact center 120 may be from a different manufacturer than the contact center 220. In this example, the real-time reports 128/contact center metrics 129 received from the report generator 132/metric collector 122 in the contact center 220 may be in different formats and require conversion into a common format by the report manager 127/report generator 132 in the contact center 120.

The social media network(s) 250 can be any type of social network 250 where users post information, converse, and/or the like. For example the social media network may be Facebook®, LinkedIn®, Twitter®, and/or the like. The report generator 132 in the contact center 120 may actively monitor the social media network(s) 250 to collect contact center metrics 129 for one or more real-time reports 128. For example, the report generator 132 in the contact center 120 may monitor discussions for a particular product or service that the contact center 120/220 may support.

The communication system(s) 260 may be any communication system that is associated with the contact center 120/220. For example, the communication system 260 may be an external ACD system that routes calls to the contact centers 120/220 at different time periods. Another example of a communication system 260 may be an external call parker that parks incoming calls when the contact center 120/220 is overloaded. The report generator 132 in the contact center 120 can use the contact center metrics 129 collected by the metric collector 122 in the communication system(s) 260 to generate one or more real-time reports 128.

The communication system(s) 260 also comprises the metric collector 122. The metric collector 122 collects contact center metrics 129 from the communication system 260 that are then collected by the report generator 128. For example, if the communication system 260 were a call parker, the metric collector 122 in the call parker may collect information on the number of calls that are parked, the time that calls were parked, the types of calls that were parked (e.g., voice/video), and/or the like.

The company service system(s) 270 can be or may include any computer system that manages/processes information for a company/enterprise. For example, the company service system(s) 270 may be a marketing database, a shipping system, an inventory system, a manufacturing system, and/or the like.

The company service system(s) 270 further comprises the metric collector 122. The metric collector 122 in the company service system(s) 270 collects contact center metrics 129 for the report manager 127. The metric collector 122 in the company service system(s) 270 may collect contact center metrics 129 associated with a product that the contact center(s) 120/220 supports. For example, the metric collector in the company service system(s) may collect inventory projections, real-time inventory metrics, real-time shipping information, and/or the like. The report generator 132 in the contact center 120 can use the collected contact center metrics 129 from the company service system(s) 270 to generate one or more real-time reports 128.

Figure 3:
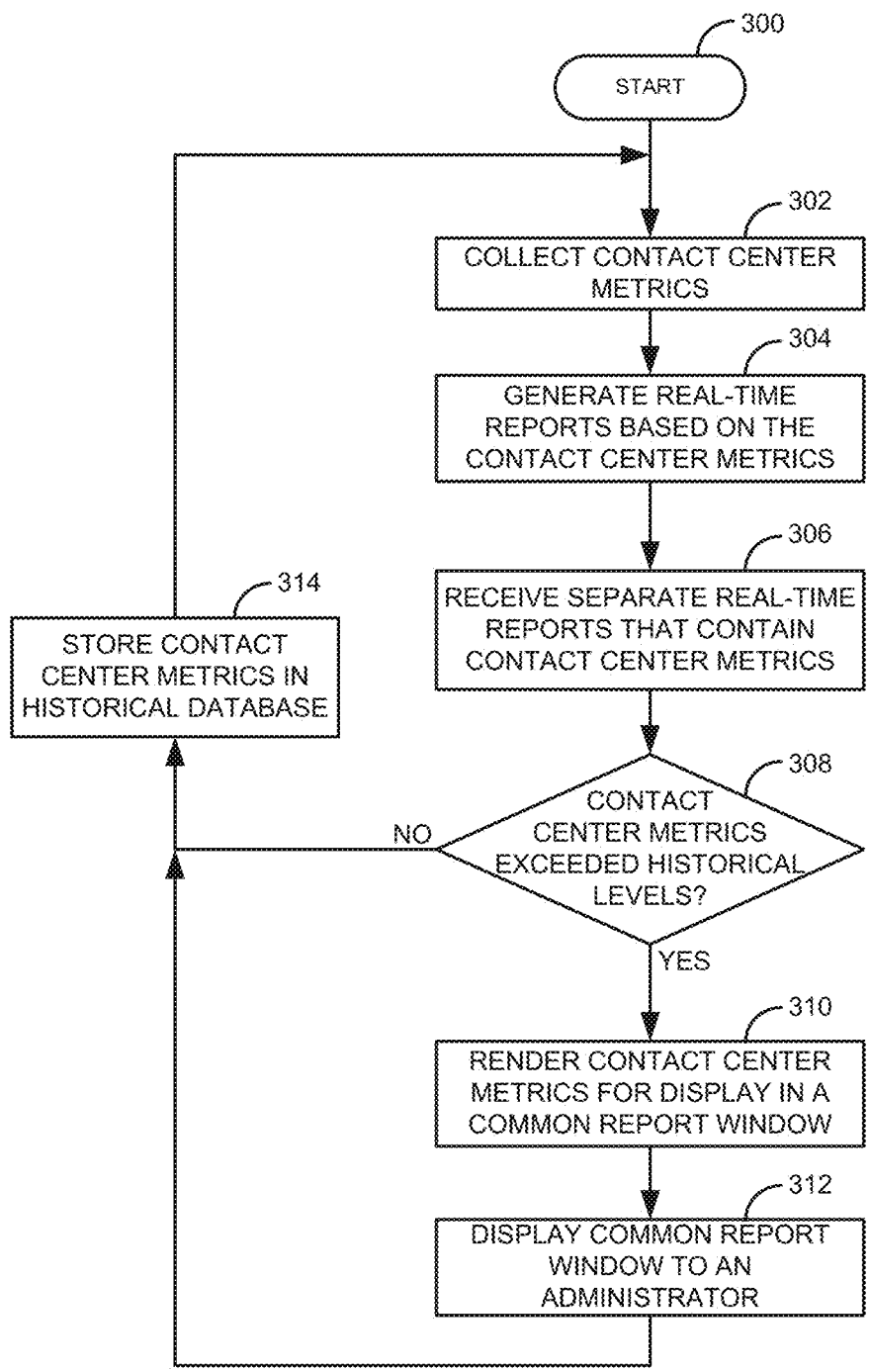
FIG. 3 is a flow diagram of a process for managing contact center metrics.

FIG. 3 is a flow diagram of a process for managing contact center metrics 129. Illustratively, the communication endpoints 101A-101N, the contact center 120/220, the communication processor 121, the metric collector 122, the IVR system 123, the contact center queue(s) 124, the agent management module 125, the historical database 126, the report manager 127, the prediction module 130, the rendering module 131, the agent terminals 132A-132N, the report generator 132, the administrative terminal 140, the social media network(s) 250, the communication system(s) 260, and the company service systems 270 are stored-program-controlled entities, such as a computer or processor, which performs the method of FIGS. 3-6 and the processes described herein by executing program instructions stored in a computer readable storage medium, such as a memory or disk. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Figure 4:
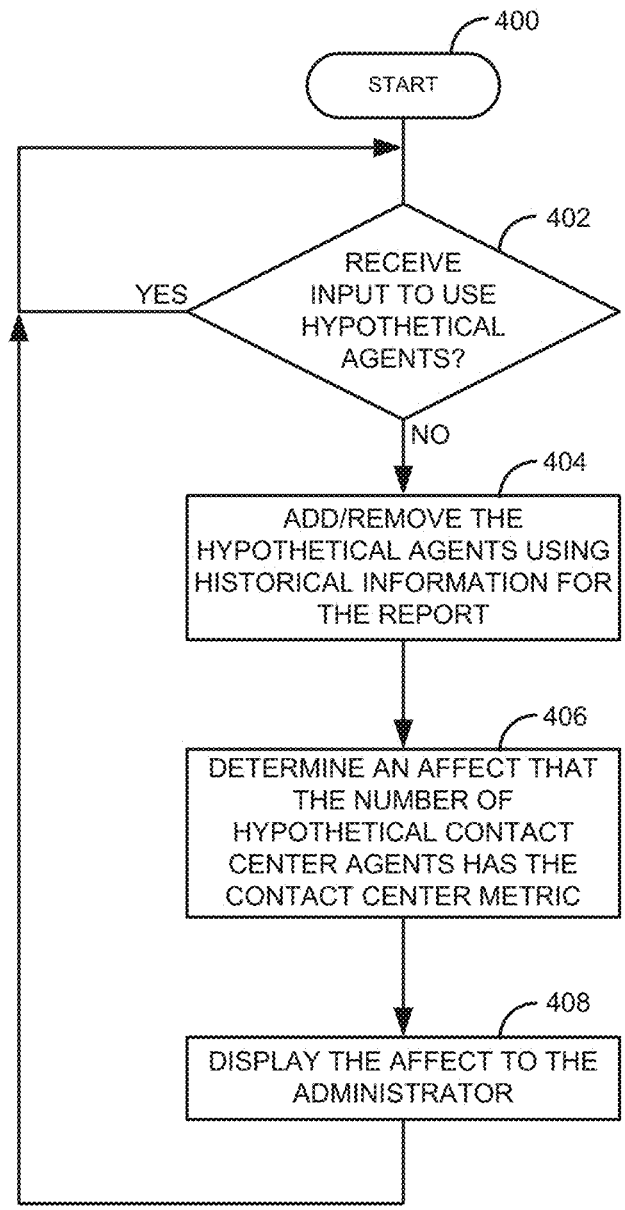
FIG. 4 is a flow diagram of a process for projecting how adding additional contact center agents or removing contact center agents can affect a contact center.
Figure 5:
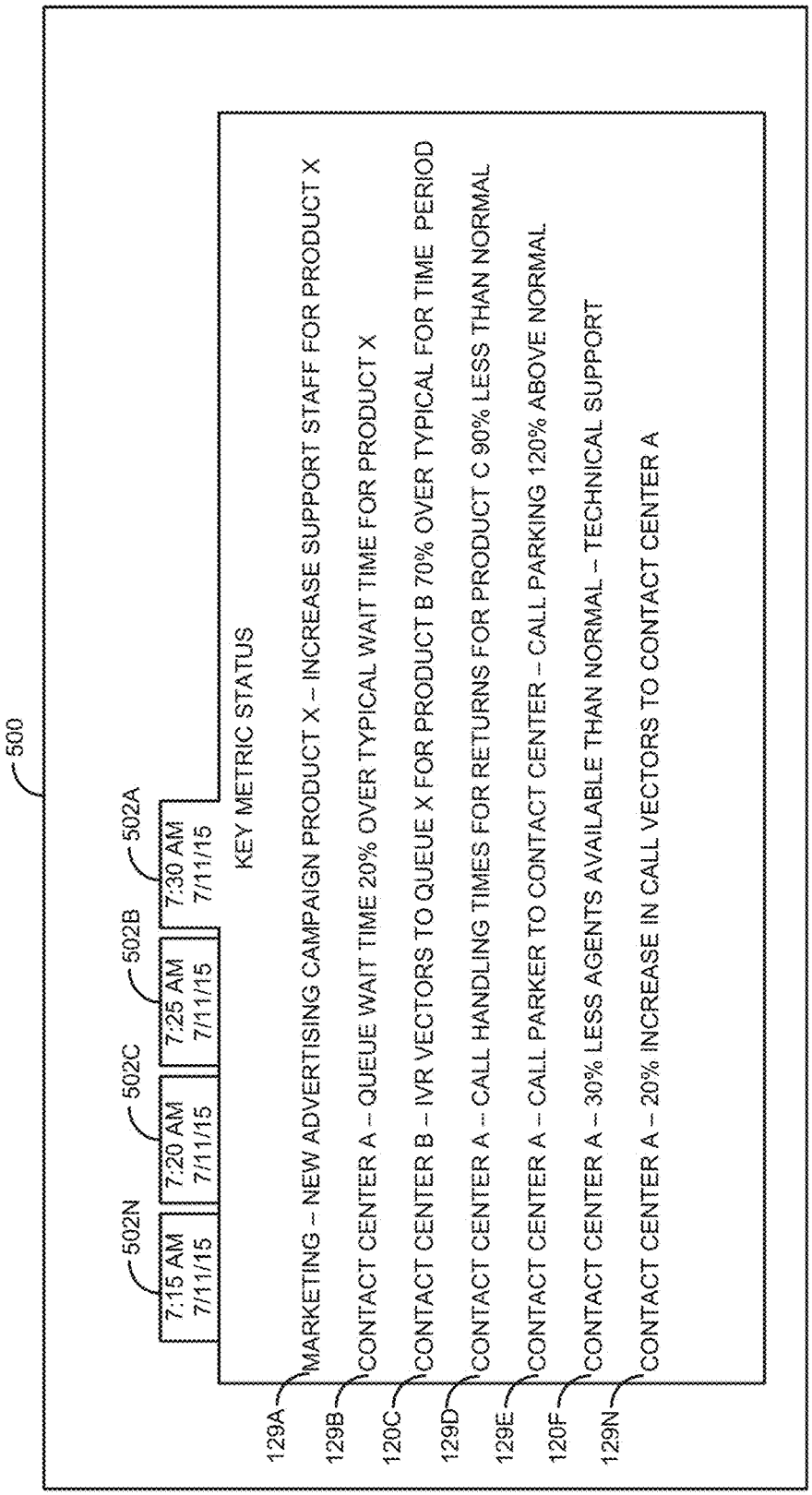
FIG. 5 is a diagram of a view of a common report window in a contact center.

Although the methods described in FIGS. 3-6 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 300.

The report generator 132 in the contact center 120 collects the contact center metrics 129 in real-time from the various metric collectors 122 in step 302. For example, the report generator 132 can collect contact center metrics 129 in real-time from one or more of the communication processor 121, the IVR system 123, the contact center queue(s) 124, the agent management module 125, the contact center 220, the social media network(s) 250, the communication system(s) 260, the company service system(s) 270, and/or the like. Each of the metric collectors 122 may be separate computer processes, such as separate threads, daemons, or virtual machines. Alternatively, a metric collector may gather data from multiple threads/daemons for specific metrics.

The report generator 132 in the contact center 120 generates the real-time reports 128 using the contact center metrics 129 in step 304. The report generator 132 generates the real-time reports 128 based on defined criteria. For example, the report generator 132 can generate the real-time reports 128 based on pre-defined groupings of contact center metrics 129, administered groupings of contact center metrics 129, and/or the like. The real-time reports 128 can be based on various contact center metrics 129, such a group of contact center agents that support a contact center queue 124, a group of agents that support a skill, a group of VDNs, and/or the like.

Figure 7:
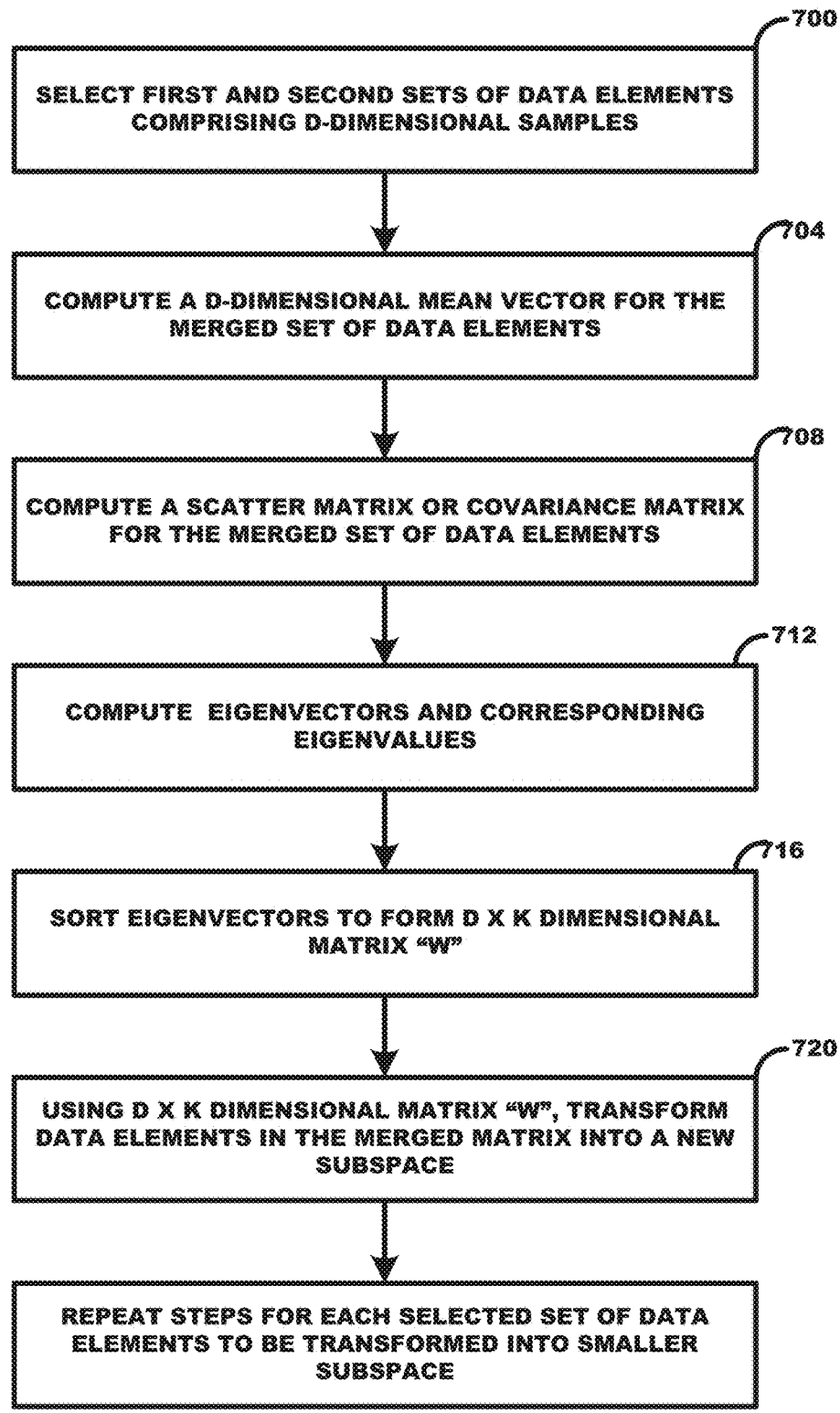
FIG. 7 is a flow diagram of a process according to an embodiment of this disclosure.

FIG. 7 is an example of report generator 132 operation. While FIG. 7 is based on principal component analysis ("PCA"), any linear transformation method can be employed. For example, multiple discrimination analysis ("MDA") can be employed. As will be appreciated, via PCA, the report generator 132 projects the entirety of a selected set of data elements (without class labels) onto a different subspace, and in MDA, the report generator determines a suitable subspace to distinguish between patterns that belong to different classes, or different selected sets of data elements. Stated another way, PCA attempts to find the axes with maximum variances where the data is most spread (within a class, since PCA treats the whole data set as one class), and MDA additionally tries to maximize the spread between classes. In some applications, PCA is followed by MDA.

In optional step 700, the report generator selects first and second sets of data elements comprising d-dimensional samples and, ignoring class labels, merges the first and second sets of data elements to form a merged set of data elements. User input for this step is to select contact center objects corresponding to the first and second sets of data elements. The first and second sets of data elements can correspond to real-time information for different selected contact center objects, real-time and historical information for a common contact center object, and historical information for different selected contact center objects or a common contact center object.

In step 704, the report generator computes (for every dimension of the first set of data elements or the first set of data elements) a d-dimensional mean vector for the merged first and second set of data elements.

In step 708, the report generator computes a scatter matrix, or the covariance matrix, for the merged set of data elements. The scatter matrix can be computed by the following equation:

$$S=\Sigma^n_{k=1}(x_k-m)(x_k-m)^T$$

where m is the mean vector $$m=(1/n)(\Sigma^n_{k=1}x_k)$$

In step 712, the report generator, using the scatter matrix, computes eigenvectors ($e_1, e_2, \ldots, e_d$) and corresponding eigenvalues ($\lambda_1, \lambda_2, \ldots, \lambda_d$). Each of the eigenvectors is associated with an eigenvalue, which indicates a "length" or "magnitude" of the eigenvectors. The equations for the covariance matrix and scatter matrix are very similar, with the primary difference being the use of a scaling factor 1/N−1 for the covariance matrix. Thus, their eigenspaces will be identical (identical eigenvectors, only the eigenvalues are scaled differently by a constant factor).

In step 716, the report generator sorts the eigenvectors by decreasing eigenvalues and selects k eigenvectors with the largest eigenvalues (or smallest eigenvalues or eigenvalues within a selected range) to form a d×k dimensional matrix W (where every column represents an eigenvector). In this step, the d-dimensional matrix is projected onto a k-dimensional subspace (where k<d).

In step 720, the d×k (eigenvector) matrix is used to transform the data elements in the merged matrix (or in the first set of data elements) onto a new subspace. This calculation can be summarized by the mathematical equation: $y=W^T \times x$ (where x is a d×1-dimensional vector representing one sample, and y is the transformed k×1-dimensional sample in the new subspace.) This step reduces the dimensionality of the space associated with the selected first and second set(s) of data elements, i.e., projecting the space via PCA onto a smaller subspace, where the eigenvectors form the axes of the new subspace.

These steps are repeated for each set of data elements to be transformed into a smaller subspace.

The smaller subspace of data elements output, or transformed set of data elements, by the report generator is converted into a report, which is typically real-time, and sent to the report manager to determine what to display.

The report manager 127 receives the real-time reports 128 that contain the contact center metrics 129 from the report generator 132 in step 306. The report manager can compare one or more contact center metrics 129 in each of the real-time reports against cost functions, acceptable and unacceptable data, specific thresholds, third party data, and exceptions from historical data to determine what to display.

The report manager 127 can determine, for example, if one or more contact center metrics 129 in each the real-time reports 128 exceeds a defined historical level in step 308. The term "exceed" means to go beyond the bounds of the historical level. This can mean going above or below an historical level. The defined historical level is based on previous historical levels from the historical database 126. For example, based on prior history, the contact center 120 service level is considered acceptable where the contact center queue 124 wait time is less than two minutes. If contact center queue 124 wait time is greater than two minutes, the report manager 127 will flag this as a metric that needs to be reported to an administrator/user. The defined historical level for a contact center metric 129 may be defined for any contact center metric 129. For example defined historical levels can be collected and stored in the historical database 126 for agent skills, VDNs, contact center queues 124, responses to IVR menus, wait times for specific skill groups over time, running of a marketing campaign, inventory levels, and/or the like. The historical levels can be used to define base lines for the historical levels. For example, an average may be determined over time. The average level over time may be used to define a level that may indicated a problem. For example, a level that is 20% average level over time may be used to indicate a problem.

The process of step 308 is typically accomplished in real-time for all the real-time reports 128. For example, if there are 100 separate real-time reports 128 received in step 306, the report manager 127 in the contact center 120 will analyze all (or a subset) of the contact center metrics 129 in each of the 100 real-time reports 128 to determine if the contact center metrics 129 exceed a defined historical level.

The defined historical levels for the contact center metrics 129 can be defined by an administrator. The administrator can define historical levels for one or more of the contact center metrics 129 in a real-time report 128. For example, the administrator can define one or more key contact center metrics 129 from each of the plurality of real-time reports 128 to see if the real-time contact center metrics 129 exceeds the defined historical level from the historical database 126 in step 308.

If one or more of the contact center metrics 129 have exceeded the defined historical levels in step 308, the rendering module 131 renders the contact center metrics 129 for the real-time reports 128 for display in a common report window (e.g., as shown in FIG. 5) in step 310. The common report window is used for displaying multiple contact center metrics 129 from the multiple real-time reports 128 that have exceeded the contact center metric's respective defined historical level. The common report window is then displayed to the administrator/user in step 312. For example, the common report window is displayed to the administrator/user in the administrative terminal 140. The report manager 127 stores the contact center metrics 129 in the historical database 126 in step 314 and the process goes back to step 302.

Otherwise, if the contact center metrics 129 have exceed the defined historical levels in step 308, the report manager 127 stores the contact center metrics 129 in the historical database 126 in step 314 and the process goes back to step 302.

The process is then repeated and new contact center metrics 129 are collected. For example, the report manager 127 may periodically update the status of the contact center metrics 129 (e.g., every 10 seconds). As the updated contact center metrics 129 are collected, a different contact center metric 129 can later reach the defined historical level and be displayed in the common report window or in a second common report window.

To illustrate the process of FIG. 3, consider the following example of a large contact center 120/220 that comprises the contact centers 120 and 220 in separate locations. Assume that the contact centers 120/220 have 10,000 agents, support 800,000 agent skills, have 54,000 VDNs, have 40,000 trunks, and have 32,000 vectors. Under normal circumstances, the amount of contact center metrics 129 would be very difficult to manage by a single user because there are over one million contact center metrics 129 that can be tracked. Previously, these metrics were tracked in hundreds of different real-time reports 128 that are managed by a large number of users (e.g., 20 users).

In this example, one real-time report 128 focuses on inbound calls for a Product X. A second real-time report 128 focuses on outbound collection calls for Product X. Normally these two real-time reports 128 would be managed in different real-time reports 128. In this example, the outbound agents are staffed as reserve agents for the inbound calls for Product X. As the call wait times for incoming calls in the contact center queue 124 for Product X exceeds the historical level, this results in the reserve agents handling the inbound calls. This event is flagged and displayed in the common report window because the historical level is temporary exceeded. As the reserve agents start handling the inbound calls, this contact center metric 129 drops below the defined historical level.

However, the agents that normally handle the outbound calls are not intended to be performing this function all the time. This results the outbound calls not exceeding an historic level (e.g., too few outbound calls being made over a time period). This is flagged and displayed in the common report window. The results that are displayed in the common report window allow the user/administrator to easily see interdependent contact center metrics 129 that are normally displayed in separate real-time reports 128. This is especially important when there are hundreds of different reports dealing with hundreds of thousands of contact center metrics 129.

FIG. 4 is a flow diagram of a process for projecting how adding additional contact center agents or removing contact center agents can affect a contact center 120/220. The process starts in step 400. When a contact center metric 129 exceeds a defined historical level (or even under normal conditions), an administrator can hypothetically determine what affect adding (or removing) a number of staffed contact center agents will have on the contact center metric 129. The administrator can enter the added/removed agents via a user interface on the administrative terminal 140. If the input is not received in step 402, the process repeats step 402.

Otherwise, if the input to use hypothetical agents is received in step 402, the prediction module 130 adds/removes the hypothetical number of agents in step 404. The hypothetical number of agents that are added or removed is based on historical information from the historical database 126. For example, if a contact center agent historically handles one incoming call every 2 minutes, this information is hypothetically added to the report in step 404. The prediction module 130 determines an affect that the added/removed number of hypothetical contact center agents has on the contact center metric 129 in step 406. For example, if an additional 20 contact center agent were added, the historical information of an agent handling a call every 2 minutes would be used to determine an affect that this would have on call wait times in a contact center queue 124. The affect could be that the incoming call wait time in the contact center queue 124 would hypothetically be reduced from 5 minutes to 3 minutes, which is below the defined historic level.

The affect is then displayed to the administrator in step 408. The administrator can use this information to determine if it makes sense to staff up the contact center 120/220 (and to what level) or not. The process then goes back to step 402.

As discussed above, the above process can also be based on hypothetically reducing the number of contact agents.

For example, an administrator may want to move contact center agents from a first product to second product. By hypothetically reducing the number of agents on the first product, the administrator could see the affect on the call wait times for the first product in real-time. This allows the administrator to see if moving the contact center agents to the second product makes sense.

FIG. 5 is a diagram of a view of a common report window 502 in a contact center 120/220. The diagram of the view of the common report window 502 comprises a display 500 (e.g., a display in the administrative terminal 140), and common report windows 502A-502N.

In this exemplary embodiment, a current view of the common report window 502A is displayed on top (e.g., stacked) of previously displayed common report windows 502B-502N. In this embodiment, the common report window 502 is updated every five minutes. The previous common report windows 502B-502N are hidden with the exception of a tab that allows an administrator to click on the particular tab to see the previous common report windows 502B-502N.

The common report window 502A comprises displayed of contact center metrics 129A-129N that have exceeded a defined historical level. The number of contact center metrics 129 that are displayed in the common report window 502 may be any number from 1 to N, where N is an integer. The displayed contact center metrics 129A-129N come from two or more of the real-time reports 128.

The contact center metric 129A displays a change where an advertising campaign is being rolled out. Based on prior history, the contact center metric 129A is flagged and displayed. For example, if historically, a new marking campaign for Product X causes a 30% increase in incoming calls for Product X, then the display of the contact center metric 1209A is displayed.

The displayed contact center metric 129B is for a contact center queue 124 wait time that is 20% over the typical historical wait times for Product X. The displayed contact center metric 129C shows that IVR vectors (call routing) to the contact center queue 124 for Product B is 70% over typical for a defined time period.

The displayed contact center metric 129D is where call handling times for Product C are 90% less than normal. As shown in contact center metric 129, a contact center metric 129 may also be below a defined historical level.

The displayed contact center metric 129E is where a call parker (e.g., a communication system 260) that parks incoming calls when the contact center 120/220 can no longer handle the incoming calls is parking calls 120% above normal. The displayed contact center metric 129F is where there are 30% less agents available than normal. For example, the agents may be in training or out with sickness.

The displayed contact center metric 129N is where there is a 20% increase in call vectors to contact center A. For example, where calls are routed to the contact center 120 instead of the contact center 220 based on a language spoken by a caller.

The above way of displaying the contact center metrics 129A-129N can be implemented in various other ways. For instance, the contact center metrics 129 can be displayed in different windows or panes.

Figure 6:
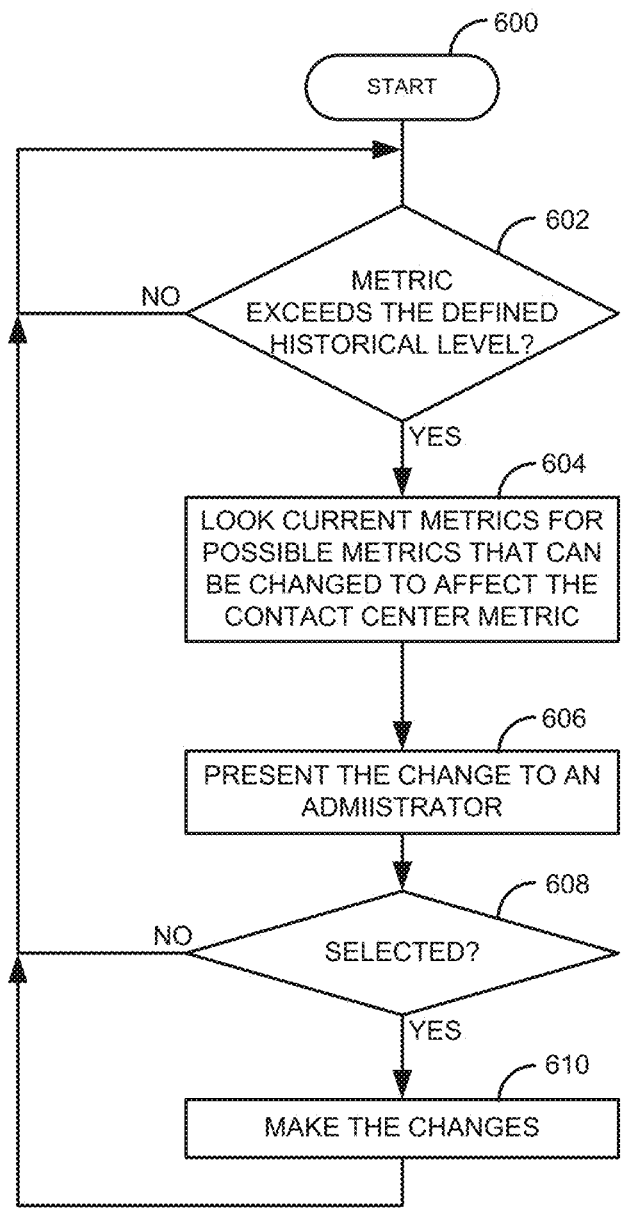
FIG. 6 is a flow diagram of a process for changing contact center metrics based on historical information.

FIG. 6 is a flow diagram of a process for changing contact center metrics 129 based on historical information. The process starts in step 600. The report manager 127 determines, in step 602, if the contact center metric 129 exceeds the historical level. If the contact center metric 129 does not exceed the historical level in step 602, the process of step 502 is repeated.

Otherwise, if the contact center metric 129 exceeded the defined historical level in step 602, the prediction module 130 looks for possible contact center metrics 129 that can be changed to affect the contact center metric 129 in step 604. For example, if the contact center queue 124 for product A is currently 50% below the historical levels, and contact center queue 124 for Product B is 40% above historical levels (the call center metric of step 602), the prediction module 130 may suggest that 10 contact center agents from the agent group that supports Product A be temporally assigned to the contact center 120/220 for the Product B. The number of agents to move may be determined based on current staffing of both agent groups and a prediction of how the changes will make the contact center metrics 129 move back to within the defined historical levels.

The proposed changes are presented to the administrator in step 606. For example, the proposed changes may be presented to an administrator using the administrative terminal 140. If the administrator selects the changes in step 608, the changes are made to the contact center 120/220 in step 610. For example, the 10 contact center agents are temporally moved from Product A to handle incoming calls for Product B. The process then goes back to step 602. Otherwise, if the administrator does not select the changes in step 608, the process goes to step 602.

Figure 8:
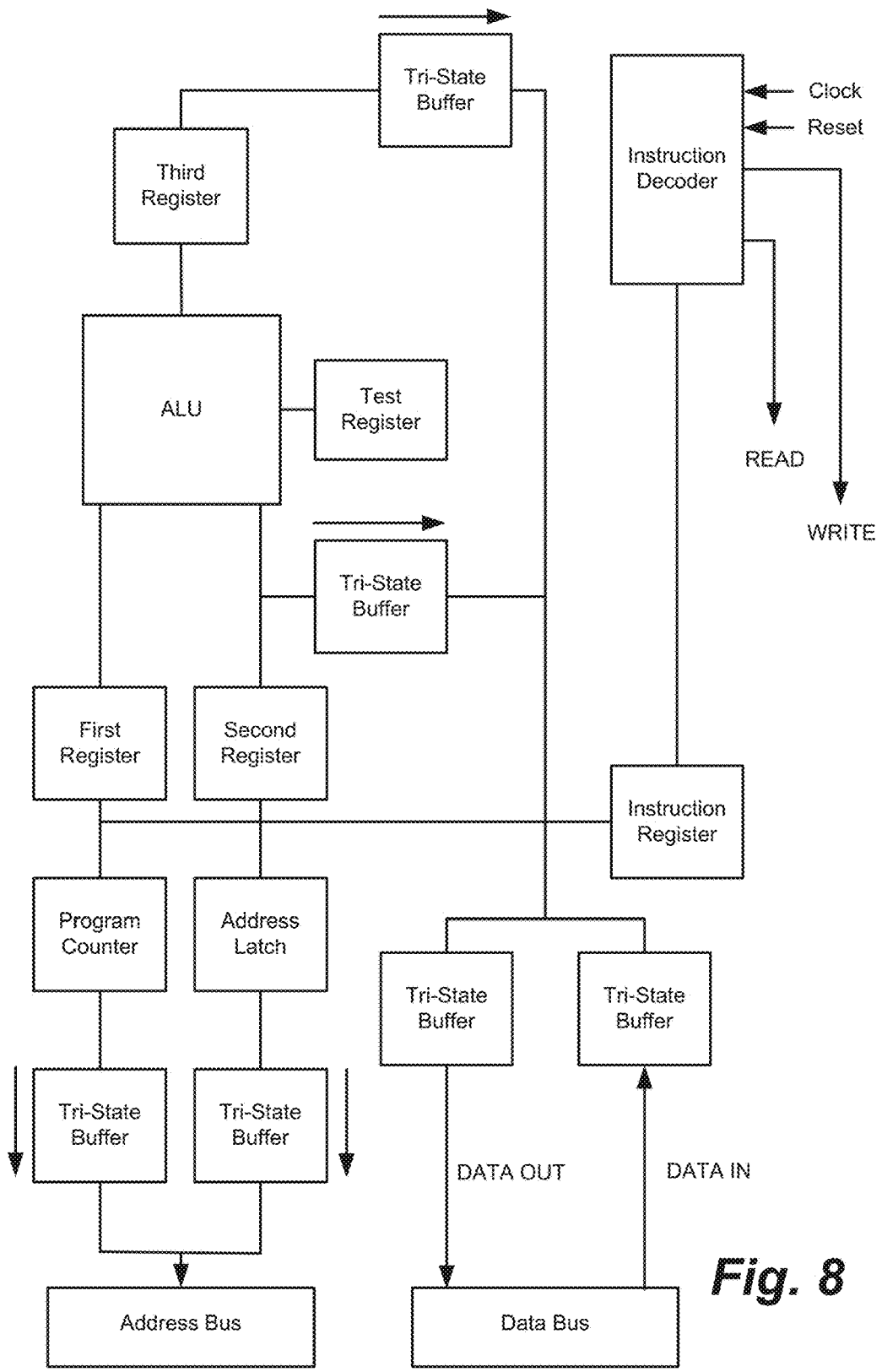
FIG. 8 is a block diagram of a computational system according to this disclosure.

With reference to FIG. 8, each of the prediction module 130, agent management module 122, report manager 128, rendering module 131, and report generator 132 execute software using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. Each of the prediction module 130, agent management module 122, report manager 128, rendering module 131, and report generator 132 can further include first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder.

By way of example, each of the computations in FIG. 7 is performed by the ALU executing algorithm instructions received from the local memory and the output, including the merged set of data elements, scatter matrix or covariant matrix, eigenvectors, eigenvalues, matrix "W", and transformed data elements are written to local memory, in response to a write command output by the instruction decoder, and at an address provided to memory by the ALU via the program counter and/or address latch via the address bus, with the data being provided to local memory via the data bus.

Comparisons of a first value for a first variable against a second value for a second variable, such as comparing a data element value against a threshold, sorting eigenvalues, and other comparisons discussed herein, can be performed using the ALU and test register. The ALU normally compares first and selected numbers and determines if they are equal, if one is greater than the other, or if one is less than the other. The test register can hold a carry bit from the last stage of the adder. The test register stores these carry bit values in flip-flops and then the instruction decoder can use the values to make decisions.

The second values are read from local memory by a read command issued by the instruction decoder, with the read data being located at an address provided to the local memory by the address bus and output by the ALU and program counter and/or address latch, with the read data being received from local memory via the data bus.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

By using comparative statistical data sets to provide adaptive analytics using principal component analysis, it can enable contact center information of interest to a user to be identified and presented in a very fast and accurate manner. It can reduce dramatically the complexity, difficulty, and number of human resources necessary to monitor effectively and run a contact center. It can monitor contact center objects of interest, such as contact center agents, to determine whether a triggering event has occurred and, if so, report metrics associated with the object of interest in a dynamic, customized, and real-time fashion. Principal component analysis can be run against real-time and historical data from contact center objects, compared with cost functions, acceptable and unacceptable data, specific thresholds, third party data, and exceptions from historical data to determine what to display. This can provide an easy to read, configurable/definable display that makes contact center management significantly easier. The adaptive data analytics infrastructure can determine how to analyze and display actionable data in a limited, but dynamic, number of panes. The infrastructure presentation can present tiles of data sets from each instance on a display and only display tiles of the most interest to a user. Data displayed within each tile can be dynamic and adaptive so that only the most interesting data is displayed. The presentation tiling can be enabled to display current and historical data that is compared to statistical data.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

What is claimed is:

1. A contact center, comprising:
   a microprocessor;
   a computer readable storage medium, coupled to the microprocessor, to store, for one or more contact center objects, contact center information; and
   a microprocessor executable report generator that, when executed by the microprocessor:
   receives, from a user, a selected contact center object;
   retrieves, from the computer readable storage medium, a set of data elements associated with the selected contact center object, the set of data elements defining a first space having a first dimension;

projects the set of data elements onto a subspace of the first space to form a first transformed set of data elements, the subspace having a second dimension less than the first dimension;

provides, for display to a user, the first transformed set of data elements, receives, from the user, a number of hypothetical contact center agents;

adds the projected number of hypothetical contact center agents into the set of data elements;

projects the set of data elements, comprising the projected number of hypothetical contact center agents, onto the subspace of the first space to form a second transformed set of data elements; and provides, for a display to a user, the second transformed set of data elements.

2. The contact center of claim 1, wherein the selected contact center object comprises multiple contact center objects, wherein the set of data elements comprises contact center metrics corresponding to an activity of different contact center objects, and wherein the microprocessor, when projecting the set of data elements, determines one or more axes with a maximum variance where the data elements are distributed most widely.

3. The contact center of claim 2, wherein the retrieved set of data elements comprises multiple sets of data elements, and wherein the multiple sets of data elements have matching numbers and types of data elements.

4. The contact center of claim 3, wherein the microprocessor executable report generator, when executed by the microprocessor, merges the multiple sets of data elements into a merged set of data elements, wherein the merging of the multiple sets of data elements is done by the microprocessor independently of any class labels associated with the data elements, and wherein the merged set of data elements is projected by the microprocessor onto the subspace to provide the first transformed set of data elements.

5. The contact center of claim 1, wherein the first transformed set of data elements is in the form of a report and further comprising a plurality of separate computer processes that, when executing, collect contact center metrics; a microprocessor executable report manager that, when executed by the microprocessor, automatically receives, from the microprocessor executable report generator, a plurality of separate reports, each comprising a plurality of different contact center metrics, determines that a first different contact center metric in a first report of the plurality of separate reports exceeds a first different historical level, and determines that a second different contact center metric in a second report of the plurality of separate reports exceeds a second different historical level; and a microprocessor executable rendering module that, when executed by the microprocessor, renders the first and second different contact center metrics for display to a user in a first common report window.

6. The contact center of claim 1, wherein the selected contact center object comprises multiple contact center objects, wherein the set of data elements comprises contact center metrics corresponding to an activity of different contact center objects, and wherein the microprocessor executable report generator, when executed by the microprocessor, computes for each dimension of the set of data elements a d-dimensional mean vector, determines, for the d-dimensional mean vector, a scatter matrix or a covariance matrix, using the scatter matrix or a covariance matrix determines plural eigenvectors, each eigenvector having a corresponding eigenvalue, selects a subset of eigenvectors from the plural eigenvectors to form a d-dimensional matrix, projects the d-dimensional matrix onto the subspace to form a d×k matrix, and uses the d×k matrix to project the set of data elements onto the subspace.

7. The contact center of claim 1, wherein the first transformed set of data elements are displayed as separate tabs based on different time periods.

8. A method, comprising:

receiving, by a microprocessor executing a microprocessor executable report generator and from a user, a selected contact center object;

retrieving, by the microprocessor and from a computer readable storage medium, a set of data elements associated with the selected contact center object, the set of data elements defining a first space having a first dimension;

projecting, by the microprocessor, the set of data elements onto a subspace of the first space to form a first transformed set of data elements, the subspace having a second dimension less than the first dimension;

providing, by the microprocessor and for display to a user, the first transformed set of data elements;

receiving, by the microprocessor and from the user, a number of hypothetical contact center agents;

adding, by the microprocessor, the projected number of hypothetical contact center agents into the set of data elements;

projecting, by the microprocessor, the set of data elements, comprising the projected number of hypothetical contact center agents, onto the subspace of the first space to form a second transformed set of data elements; and providing, by the microprocessor and for display to a user, the second transformed set of data elements.

9. The method of claim 8, wherein the selected contact center object comprises multiple contact center objects, wherein the set of data elements comprises contact center metrics corresponding to an activity of different contact center objects, and wherein the projection by the microprocessor determines one or more axes with a maximum variance where the data elements are distributed most widely.

10. The method of claim 9, wherein the retrieved set of data elements comprises multiple sets of data elements, and wherein the multiple sets of data elements have matching numbers and types of data elements.

11. The method of claim 10, wherein the microprocessor, when executing the microprocessor executable report generator, merges the multiple sets of data elements into a merged set of data elements, wherein the microprocessor merges the multiple sets of data elements independently of any class labels associated with the data elements, and wherein the microprocessor merges the set of data elements onto the subspace to provide the first transformed set of data elements.

12. The method of claim 8, wherein the first transformed set of data elements is in the form of a report and further comprising:

collecting, by a plurality of separate computer processes, contact center metrics;

automatically receiving, by the microprocessor executing a microprocessor executable report manager and from the microprocessor executable report generator, a plurality of separate reports, each comprising a plurality of different contact center metrics;

determining, by the microprocessor executing the microprocessor executable report manager, that a first different contact center metric in a first report of the plurality of separate reports exceeds a first different historical level; and determining, by the microprocessor executing the microprocessor executable report manager, that a second different contact center metric in a second report of the plurality of separate reports exceeds a second different historical level.

13. The method of claim 8, wherein the selected contact center object comprises multiple contact center objects, wherein the set of data elements comprises contact center metrics corresponding to an activity of different contact center objects, and wherein the microprocessor executable report generator, when executed by the microprocessor, computes for each dimension of the set of data elements a d-dimensional mean vector, determines, for the d-dimensional mean vector, a scatter matrix or a covariance matrix, using the scatter matrix or a covariance matrix determines plural eigenvectors, each eigenvector having a corresponding eigenvalue, selects a subset of eigenvectors from the plural eigenvectors to form a d-dimensional matrix, projects the d-dimensional matrix onto the subspace to form a d×k matrix, and uses the d×k matrix to project the set of data elements onto the subspace.

14. A computer readable storage medium comprising microprocessor executable instructions embodied thereon that, when executed, cause a microprocessor to:

automatically receive a selected contact center object;

automatically retrieve a set of data elements associated with the selected contact center object, the set of data elements defining a first space having a first dimension;

automatically project the set of data elements onto a subspace of the first space to form a first transformed set of data elements, the subspace having a second dimension less than the first dimension;

automatically provide, for display to a user, the first transformed set of data elements;

receive, from the user, a number of hypothetical contact center agents;

automatically add the projected number of hypothetical contact center agents into the set of data elements;

automatically project the set of data elements onto the subspace of the first space to form a second transformed set of data elements; and automatically provide, for display to a user, the second transformed set of data elements.

15. The computer readable storage medium of claim 14, wherein the selected contact center object comprises multiple contact center objects, wherein the set of data elements comprises contact center metrics corresponding to an activity of different contact center objects, and wherein the projection by the microprocessor determines one or more axes with a maximum variance where the data elements are distributed most widely.

16. The computer readable storage medium of claim 15, wherein the retrieved set of data elements comprises multiple sets of data elements, and wherein the multiple sets of data elements have matching numbers and types of data elements.

17. The computer readable storage medium of claim 16, further comprising instructions, when executed, cause the microprocessor to: merge the multiple sets of data elements into a merged set of data elements; merge the multiple sets of data elements independently of any class labels associated with the data elements, and; merge the set of data elements onto the subspace to provide the first transformed set of data elements.

18. The computer readable storage medium of claim 15, wherein the first transformed set of data elements is in the form of a report and further comprising instructions, when executed, cause the microprocessor to:

automatically receive, from a plurality of separate computer processes, contact center metrics;

automatically receive a plurality of separate reports, each comprising a plurality of different contact center metrics;

automatically determine that a first different contact center metric in a first report of the plurality of separate reports exceeds a first different historical level;

automatically determine that a second different contact center metric in a second report of the plurality of separate reports exceeds a second different historical level; and automatically render the first and second different contact center metrics for display to a user in a first common report window.

19. The computer readable storage medium of claim 14, wherein the selected contact center object comprises multiple contact center objects, wherein the set of data elements comprises contact center metrics corresponding to an activity of different contact center objects, and further comprising instructions, when executed, cause the microprocessor to: computes for each dimension of the set of data elements a d-dimensional mean vector; determines, for the d-dimensional mean vector, a scatter matrix or a covariance matrix, using the scatter matrix or a covariance matrix determines plural eigenvectors, each eigenvector having a corresponding eigenvalue; selects a subset of eigenvectors from the plural eigenvectors to form a d-dimensional matrix; projects the d-dimensional matrix onto the subspace to form a d×k matrix; and uses the d×k matrix to project the set of data elements onto the subspace.

20. The computer readable storage medium of claim 14, wherein the first transformed set of data elements are displayed as separate tabs based on different time periods.

* * * * *